Patented Feb. 23, 1937

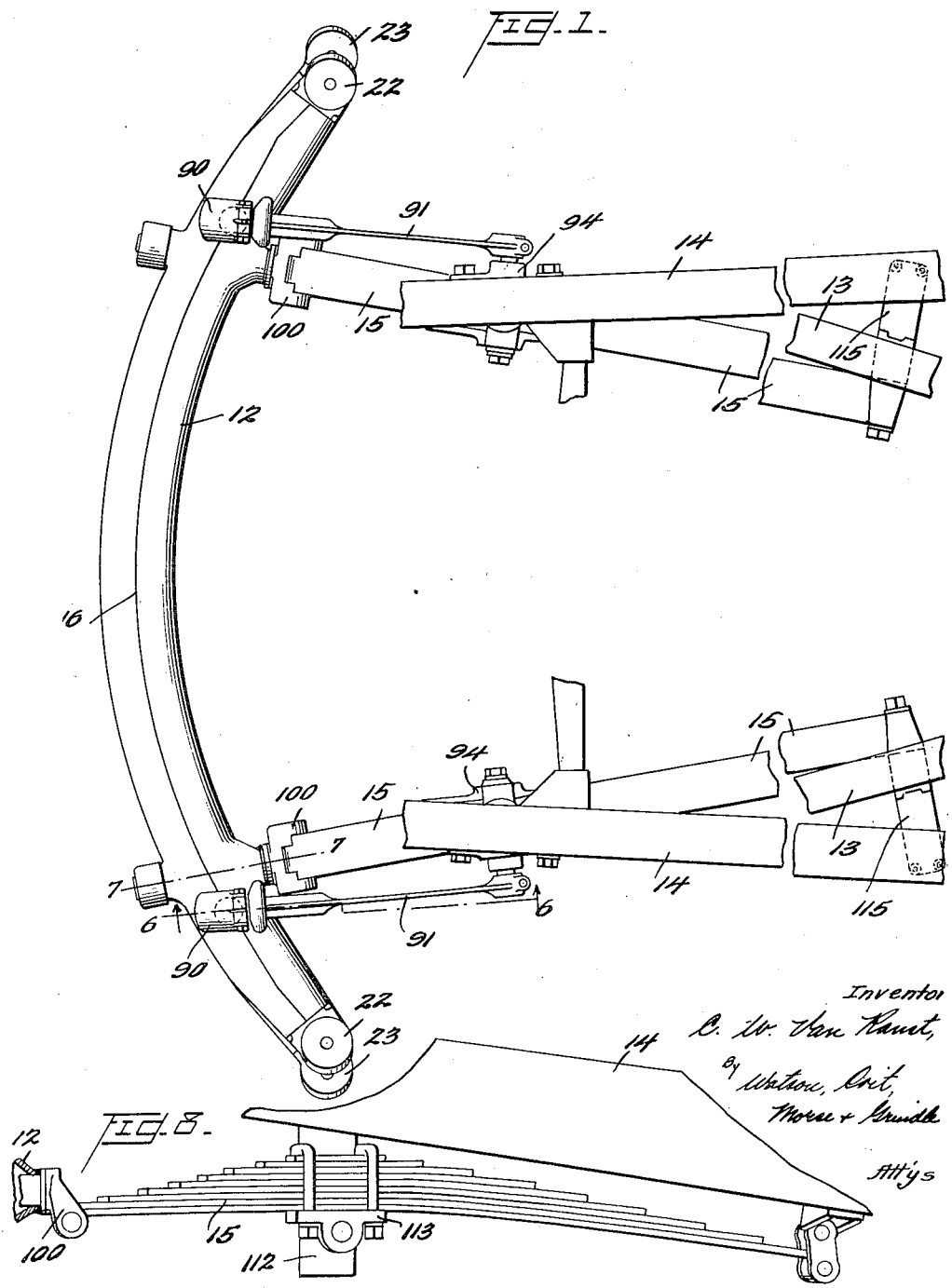

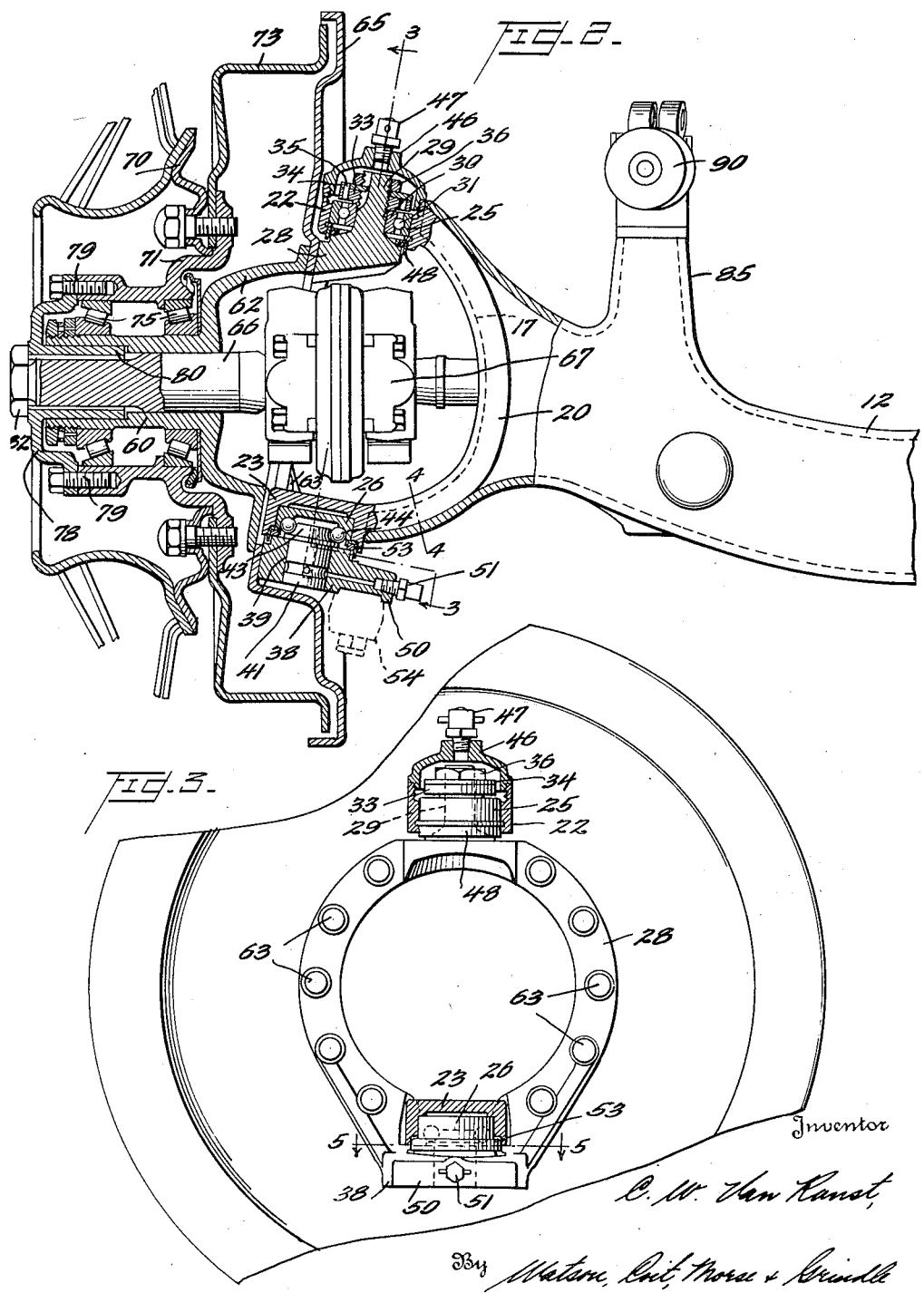

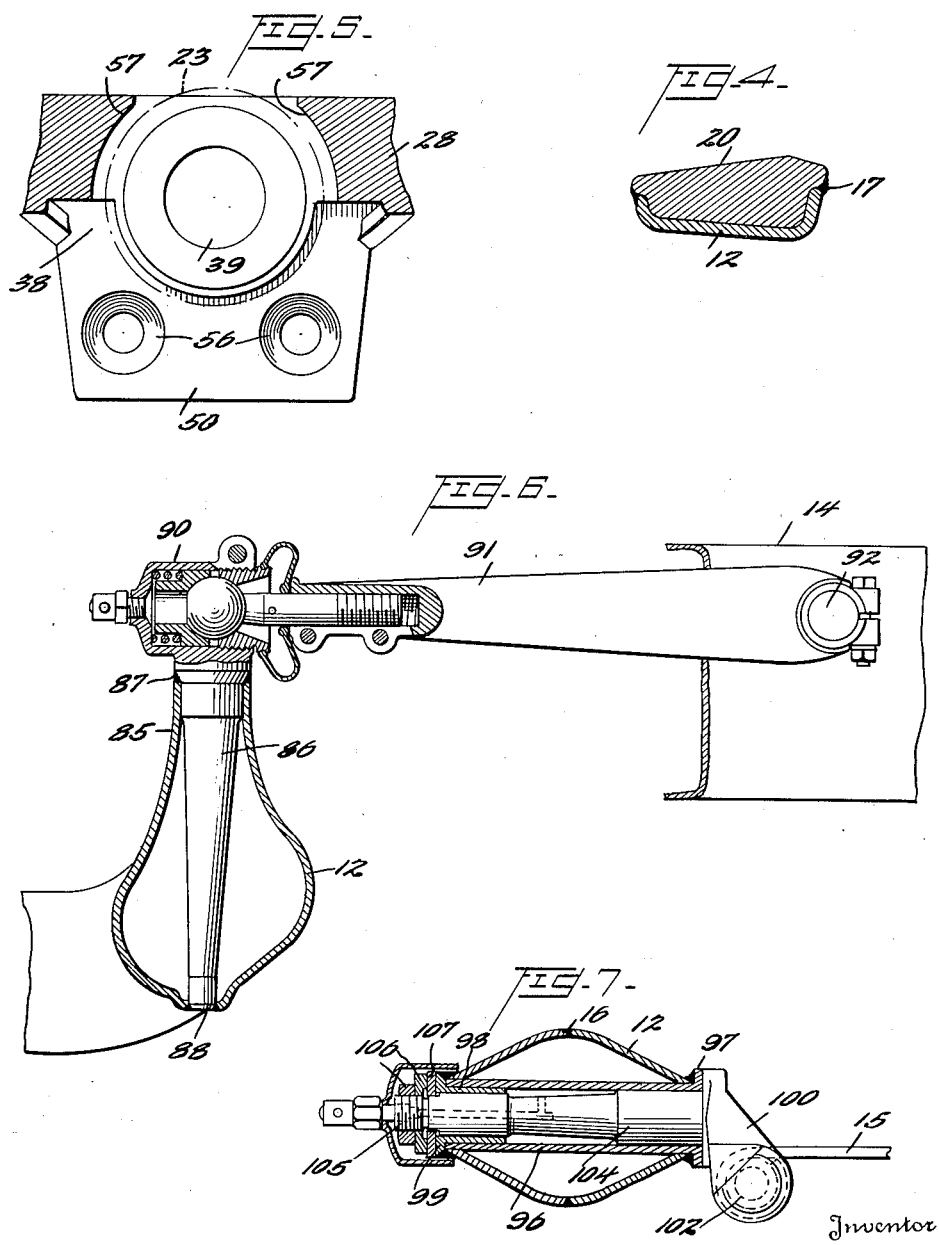

2,071,714

UNITED STATES PATENT OFFICE 2,071,714

MOTOR VEHICLE

Cornelius W. Van Ranst, Detroit, Mich., assignor to Packard Motor Car Company, Detroit, Mich., a corporation of Michigan Application March 21, 1932, Serial No. 600,347

4 Claims. (Cl. 267—66)

This invention relates to motor vehicles and more particularly to structures for supporting the vehicle body frame on the front vehicle wheels. The invention is particularly applicable to motor vehicles employing a front wheel drive and is described herein with reference to this type of vehicle. It will nevertheless be understood that various features of the invention may be empoyed in vehicles of other types.

It is the primary object of the invention to provide a front axle and dirigible wheel mounting having maximum strength and minimum weight so that the increased weight resulting from the disposition of the entire motive apparatus at the forward end of the vehicle will be adequately supported.

A further object of the invention is the provision of a dirigible wheel mounting which is inexpensive to construct and which may be readily assembled and is of such nature that a compact and simple driving mechanism for the wheel may be accommodated.

It is a feature of the invention that the universal joint connections ordinarily employed between the differential gearing and the driving wheels may be partially or wholly housed within the steering knuckle and associated parts without sacrificing the strength of these parts.

Further objects and features of the invention will be apparent from the following description taken in connection with the accompanying drawings, in which:

Figure 1 is a plan view of the forward end of a vehicle chassis constructed in accordance with the principles of the invention;

Figure 2 is a view partly in section through a wheel hub and one end of the axle on which the wheel is mounted;

Figure 3 is a section taken substantially on the line 3—3 of Figure 2;

Figure 4 is a section on the line 4—4 of Figure 2;

Figure 5 is a section on the line 5—5 of Figure 3;

Figure 6 is a section on the line 6—6 of Figure 1 illustrating the manner of connecting the radius rod to the front axle;

Figure 7 is a section on the line 7—7 of Figure 1 showing the mounting of the vehicle spring on the axle; and Figure 8 is an elevational view illustrating the vehicle spring mounting.

For convenience in describing the invention reference is made to the details of the construction illustrated by way of example in the drawings. It will nevertheless be appreciated that there is no intention of limiting the invention by the use of specific language in describing the preferred embodiment thereof and that various alterations and changes are contemplated such as may be required to adapt the arrangement shown herein to different conditions of service.

The vehicle axle shown in plan in Figure 1 of the drawings is designated by the numeral 12, this axle serving to support the forward end of the vehicle frame as represented by the side frame members 14 and the cross frame members 13 through the vehicle springs 15 which are secured to the axle and the frame members in the manner hereinafter described. The axle is preferably formed of pressed metal such as sheet steel and comprises two portions which are welded at their meeting edges above and below the axle body as indicated at 16 in Figure 1 of the drawings. It will be observed that the axle is hollow or tubular and may thus be constructed to afford the required rigidity with minimum weight. Each end of the axle is flared and assumes a bowed or forked shape as indicated by the dotted line at 17 in Figure 2 and a forked member or yoke 20 is seated within the forked end of the axle and embraced thereby, the side walls at the extremity of the axle engaging the lateral portions of the yoke 20 and being welded thereto along the line 17. Each yoke 20 serves to support the bearings on which the associated vehicle wheel is swivelled and for this purpose is provided at its upper extremity with an integrally formed annular collar portion 22 and at its lower extremity with a substantially circular cup-shaped portion 23. It will be observed that a bearing race 25 is seated in the portion 22 of the yoke and a bearing race 26 is fitted within the cup-shaped portion 23. These races may be secured in the respective extremities of the yoke in any desired manner.

It will be observed from the arrangement thus far described that the entire axle including the steering knuckle bearing supports affords an exceedingly sturdy construction, and when completed is substantially integral owing to the union of the several parts by welding.

The steering knuckle preferably comprises a substantially annular outwardly facing member 28 shown more particularly in Figure 3 of the drawings, this member being arranged to cooperate with the bearings carried by the axle to support the wheel for steering movement. For this purpose the member 28 is provided adjacent the upper portion thereof with an integrally formed upwardly extending spindle 29 on which is fitted an inner bearing race 30, balls 31 being arranged between the races 30 and 25. The race 30 is preferably retained in position on the spindle 29 by means of the collar 33 threaded on the spindle and locked against rotation by means of a washer 34 keyed to the spindle and provided with pins 35 projecting into the collar. A nut 36 threaded on the spindle retains the washer 34 in position and completes the assembly.

At its lower portion the member 28 is provided with an enlargement or boss 38 having an aperture 39 therethrough adapted to receive the member 41, which may, if desired, be secured in position within the aperture. The upper protruding portion 43 of the member 41 is formed as a ball race and balls 44 are interposed between this race and the race member 26 carried by the yoke 20.

In order to facilitate lubrication of the upper and lower knuckle bearings a cap 46 provided with a grease connection 47 is threaded within the upper portion of the collar 22, and lubricant forced within the cavity thus formed is retained therein by a suitable sealing device 48 between the adjacent portions of the collar 22 and the annular member 28. Similarly the boss 38 is provided with an outwardly extending arm 50 in which is seated a grease connection 51, the arm 50, the boss 38, and the member 41 being drilled and recessed as shown in Figure 2 of the drawings to permit discharge of lubricant into the cavity between the boss 38 and the cup-shaped member 23 carried by the yoke 20, a sealing device 53 being provided between the adjacent relatively movable parts to prevent loss of lubricant.

It will be noted that the annular member 28 may be readily assembled to the yoke 20 by first assembling the race members 25 and 30 in the collar portion 22 of the yoke, and moving the member 28 together with the spindle 29 and the member 41 carried thereby upwardly within the outer extremities of the fork 20 to the position shown in Figure 2, the collar 33 and associated parts being then assembled on the spindle 29.

It will be observed that the usual steering arm 54 is shown in Figure 2 as carried by the arm 50 which is integral with the member 28. Figure 5 of the drawings showing a section through the boss 38 of the member 28 illustrates in more detail the construction of the arm 50, the latter being provided with apertures 56 through which bolts may be passed to secure the steering arm 54 rigidly in position. Figure 5 also illustrates the manner in which the upper portion of the boss 38 is cut away as shown at 57 on either side to receive the cup-shaped member 23 and provide the necessary clearance therebetween.

The vehicle wheel is supported on the annular member 28 by means of a sleeve 60, this sleeve having preferably formed integrally therewith a cup-shaped member 62 of more or less spherical outline having its open end facing the axle and riveted to the annular member 28 as indicated at 63. A brake backing plate 65 may be interposed between the member 62 and the annular member 28, the rivets indicated at 63 passing through these members and the plate. A driving shaft 66 which is coupled to the vehicle wheel as hereinafter described is connected with the shafting driven by the differential gearing from the motor through a universal joint indicated generally at 67. The construction of the annular member 28 and the cup-shaped member 62 by means of which the wheel is carried on the axle is thus of considerable importance since the universal joint 67 may be accommodated substantially within these members and closely adjacent the vehicle wheel, aside from the very considerable strength which this construction affords. The arrangement is extremely compact and the length of the shafting between the differential gearing and the universal joint may be increased by locating the joint closely adjacent the wheel structure and the angularity of the shafting on relative movement of the axle and frame may be correspondingly reduced with resulting reduction in wear in the relatively movable members of the universal joint.

The wheel hub members 70 and 71 carry the brake drum 73, the brake shoes being omitted for convenience in illustration, and the hub members are supported by means of bearings 75 on the sleeve 60. A driving plate 78 is secured by pins 79 to the hub member 71 and is provided with an inwardly projecting sleeve portion 80 which has a rotatable fit within the sleeve 60 and is keyed to the shaft 66, it being observed that radial clearance is provided between the shaft 66 and the sleeve portion 80 so that the vehicle wheel is supported for rotative movement entirely by the bearings 75 on the exterior of the sleeve 60. A nut 82 is threaded on the outer end of the shaft 60 and engages the driving plate 78 to retain the parts in assembled position.

Referring now more particularly to Figures 1 and 6 of the drawings, it will be observed that the axle 12 is distended or pressed out to form upstanding neck portions 85 adjacent each end of the axle, an upstanding spindle 86 passing through each neck portion and through the interior of the axle and the opposite wall thereof, this spindle being welded to the neck portion and the opposite wall of the axle as shown at 87 and 88 respectively. Each spindle 86 is provided at its upper end with a substantially cylindrical portion 90 and is adapted to receive therein a ball and socket connection for a radius rod 91. The preferred construction of the ball and socket connection is shown in Figure 6 and need not be described in detail.

At its opposite end the radius rod 91 is secured to a shaft 92 which projects through the corresponding frame member 14 and is journalled for rotation therein in any suitable manner about an axis transverse to the longitudinal axis of the vehicle. A shock absorber designated generally at 94 of any conventional type is secured in position on the opposite side of the frame member and is adapted to be actuated by rotation of the shaft 92.

Thus the axle or either end thereof is permitted to move through an arc defined by the radius rods about the axis of the shaft 92, and such movement serves to rock the shaft and operate the shock absorber to resist sudden or accelerative relative movement of the axle and frame.

The forward and rearward faces of the axle are also distended at points adjacent each end of the axle as shown in Figure 7 and provided with openings through which may be passed a sleeve 96 having an annular flange portion 97 at one end thereof. A sleeve 98 having a flange portion 99 is inserted in the opposite end of the sleeve 96 and the parts are welded as shown to secure the sleeves 96 and 98 and the axle together to form a substantially homogeneous unit. A spring hanger 100 embodying the usual yoke shape and carrying a pin 102 on which one end of the associated spring 15 is mounted, is provided with a spindle 104, this spindle being preferably formed integrally with the spring hanger. The spindle 104 passes through the sleeves 96 and 98 and is journalled therein and is provided at its outer end with a reduced and threaded portion 105. A washer 107 and nuts 106 threaded on the spindle form an abutment engaging the flange 99 on the sleeve 98 and thus the spindle is retained against axial displacement in either direction and at the same time is free to rotate so that the spring may be readily accommodated to the different positions assumed by the front wheels and the axle when an uneven road bed is encountered and torsional strain on the spring substantially eliminated.

The springs 15 are preferably of the cantilever type and may be supported at two points on the vehicle frame. As hereinbefore mentioned, and as shown more particularly in my application for Letters Patent for improvements in motor vehicles, Serial No. 600,345, filed concurrently herewith, the body frame construction is preferably of the type in which cross frame members 13 are provided, the cross frame members and the side frame members 14 being bolted together adjacent the forward end of the vehicle. Each spring is secured to the vehicle substantially midway of its length adjacent the meeting point of the cross frame and side frame members by means of a bracket 112 which carries a conventional support 113, as shown in Figure 8. At their rearward ends the springs are carried in hangers secured to a bracket 115 which serves as a brace between the cross frame members and side frame members adjacent to and rearwardly of the point at which these members merge and are secured together.

It will be observed that the construction throughout is one of the utmost simplicity and is particularly suited to conditions existing in motor vehicles of the front wheel drive type although the arrangement is applicable to any vehicle in which unusual strength and light weight are required in the running gear at the forward end of the vehicle. This is of course true of various types of independent wheel suspension in which separate axles, sometimes described as pivoted links or arms, are associated with the oppositely disposed vehicle wheels. It will be understood that the term "axle" as employed herein is used broadly to designate any of these various types of wheel supporting members functioning to carry the wheels for movement with respect to the vehicle frame.

Having thus described the invention, what is claimed as new and desired to be secured by Letters Patent is:

1. In a vehicle, the combination with an axle, vehicle frame members, springs for supporting the frame members on the axle, a substantially horizontal radius rod connected to said axle, a shaft extending through one of said frame members and supported for oscillation about an axis transverse to the longitudinal axis of the vehicle, said shaft being secured to said radius rod, and a shock absorber mounted on the last named frame member, said shock absorber being connected to said shaft and actuated upon oscillation of said shaft.

2. In a vehicle axle, the combination with a tubular axle body, of a spindle extending through said axle body and welded thereto at opposite sides of the body, and a radius rod connected with said spindle.

3. In a vehicle axle, the combination with a tubular axle body having a portion thereof distended to form an upstanding neck, a spindle passing through said neck and the remote side of the body, and a radius rod connection carried by said spindle.

4. In a vehicle axle, the combination with a tubular axle body having a portion thereof distended to form an upstanding neck, a spindle passing through said neck and the remote side of the body and welded to both, and a radius rod connected to said spindle adjacent said neck.

CORNELIUS W. VAN RANST.